US011574055B2

(12) United States Patent
Schack et al.

(10) Patent No.: US 11,574,055 B2
(45) Date of Patent: Feb. 7, 2023

(54) VALIDATION AND INSTALLATION OF A FILE SYSTEM

(71) Applicant: Landis+Gyr Innovations, Inc., Alpharetta, GA (US)

(72) Inventors: August Schack, Brainerd, MN (US); Craig Leon Cornwall, Alpharetta, GA (US); Rodney Kohout, Brainerd, MN (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 437 days.

(21) Appl. No.: 16/584,101

(22) Filed: Sep. 26, 2019

(65) Prior Publication Data
US 2020/0104495 A1 Apr. 2, 2020

Related U.S. Application Data

(60) Provisional application No. 62/737,336, filed on Sep. 27, 2018.

(51) Int. Cl.
*G06F 21/56* (2013.01)
*G06F 21/57* (2013.01)
(Continued)

(52) U.S. Cl.
CPC .......... *G06F 21/565* (2013.01); *G06F 21/572* (2013.01); *G06F 21/575* (2013.01);
(Continued)

(58) Field of Classification Search
CPC .... G06F 21/565; G06F 21/572; G06F 21/575; G06F 21/602; H04L 9/0643; H04L 9/3247
See application file for complete search history.

(56) References Cited

U.S. PATENT DOCUMENTS

| 8,639,625 B1* | 1/2014 | Ginter | G06F 21/51 |
| | | | 705/51 |
| 2008/0101596 A1* | 5/2008 | Cerruti | G06F 21/602 |
| | | | 380/30 |

(Continued)

FOREIGN PATENT DOCUMENTS

CN 102521289 6/2012

OTHER PUBLICATIONS

Glass, "Verified U-Boot", available online at, https://lwn.net/Articles/571031/, Oct. 23, 2013, 5 pages.

(Continued)

*Primary Examiner* — Jaweed A Abbaszadeh
*Assistant Examiner* — Cheri L Harrington
(74) *Attorney, Agent, or Firm* — Kilpatrick Townsend & Stockton LLP

(57) ABSTRACT

Certain aspects of the disclosure are directed toward validation and installation of a file system. A method for mitigating security breach for a circuit platform subject to compromise by unauthorized changes to a file system includes abstracting the file system into an encrypted file with cryptographically signed components. The file system may have instruction code or other data for an operating system and may be stored by or on behalf of the circuit platform. During boot time of the operating system, an unencrypted version of the operating system and the encrypted file may be accessed and used by validating a signature associated with the file system. In response to validating the signature, the file system is installed into a transient, non-persistent storage circuit. As such, the operating system executes instruction code via a central processing unit (CPU) circuit under authorization based on the validated signature.

16 Claims, 4 Drawing Sheets

(51) Int. Cl.
  *G06F 21/60* (2013.01)
  *H04L 9/06* (2006.01)
  *H04L 9/32* (2006.01)

(52) U.S. Cl.
  CPC .......... *G06F 21/602* (2013.01); *H04L 9/0643* (2013.01); *H04L 9/3247* (2013.01); *G06F 2221/034* (2013.01)

(56) References Cited

U.S. PATENT DOCUMENTS

| | | | |
|---|---|---|---|
| 2009/0100516 A1* | 4/2009 | Ray | G06F 15/177 726/19 |
| 2015/0172255 A1* | 6/2015 | Warnez | G06F 8/65 713/168 |
| 2018/0247059 A1* | 8/2018 | Nara | H04L 9/3247 |

OTHER PUBLICATIONS

Jones et al., "The Fundamentals of Secure Boot and Secure Download: How to Protect Firmware and Data Within Embedded Devices", available online at, https://www.maximintegrated.com/en/design/technical-documents/app-notes/6/6426.html, May 19, 2017, 8 pages.
International Patent Application No. PCT/US2019/053214, "dated International Search Report and Written Opinion", Nov. 13, 2019, 14 pages.

\* cited by examiner

VALIDATION AND INSTALLATION OF A FILE SYSTEM

CROSS-REFERENCE TO RELATED APPLICATIONS

The present disclosure claims priority to U.S. Provisional Application Ser. No. 62/737,336 for "Validation and Installation of a File System," filed Sep. 27, 2018, which is incorporated by reference herein in its entirety.

BACKGROUND

Aspects of various embodiments are directed to validation and installation of a file system. A processor-based system may boot using firmware stored on the processor-based system. The boot up process may be implemented with basic input/output system (BIOS) firmware. Sometimes, this firmware needs to be updated to accommodate new features or other variations including new hardware and software components.

SUMMARY

Various example embodiments are directed to issues such as those addressed above or others which may become apparent from the following disclosure concerning validation and installation of a file system. For deployed computing devices, concerns may arise that the file system of the computing device may be compromised and system files can be corrupted or modified, and extraneous software or firmware may be added to the system by an unauthorized individual.

Various example embodiments described herein include systems, devices, and methods for mitigating the risk of corruption of such file systems by abstracting the file system into encrypted and cryptographically signed components. A non-persistent file system, such as a random access memory (RAM) based non-persistent file system may be created. During boot time of the file system, the operating system, software, and firmware of the file system may be unencrypted and the signature used on the cryptographically signed components may be validated to validate the authenticity of such components. After validation, the operating system, software, and firmware are installed into the non-persistent (e.g., RAM) file system. Accordingly, the various example embodiments described herein ensure that the firmware running on file system is authorized, and such embodiments mitigate the risk of file system tampering. The non-persistent based file system may ensure, because of its transient and non-persistent nature, that files that were inadvertently or surreptitiously added will be purged during the next boot cycle.

In accordance with example embodiments of the present disclosure, security breaches for a circuit platform subject to compromise by unauthorized changes to a file system may be mitigated by abstracting the file system into an encrypted file with cryptographically signed components. The file system may have data such as instruction code for an operating system. During boot time of the operating system, an unencrypted version of the operating system may be accessed and used by validating a signature that is associated with the file system and, in particular, is relative to (i.e., related to) the signed components in that the signature was used to sign the signed components. In response to the validation of the signature, the file system may be installed into a transient, non-persistent storage circuit. As such, the operating system may execute instruction code via a central processing unit (CPU) circuit under authorization via (i.e., based on) the validated signature. In other words, validation of the signature may authorize the operating system to execute the instruction code.

In a more specific example embodiment, a system for validating a file system includes a processor including a CPU circuit and further includes a memory circuit. In such example embodiments, the memory circuit includes instructions that, when executed by the processor cause the processor, during boot time of a file system having instruction code or other data, to boot a transient, non-persistent storage circuit with a minimal number of modules loaded (e.g., a number less than those needed for a fully functional operating system). Once the transient, non-persistent storage circuit boots, the processor may execute instructions stored in the memory circuit to read and validate a signature of the file system. In response to validation of the file system (i.e., validation of the signature of the file system), the processor installs packages of the file system into the transient, non-persistent storage circuit, and the packages of the file system are encrypted. In response to installation of the file system packages, configuration and running-state files of the file system are decrypted and loaded.

In another specific example embodiment, security breaches for a circuit platform subject to compromise by unauthorized changes to a file system may be mitigated by a non-transitory computer readable medium storing instructions executable by a processor, including a CPU circuit. In such example embodiments, the file system includes instruction code or other data for an operating system and is stored by or on behalf of the circuit platform. The instructions, when executed by the processor, cause the processor to abstract the file system into an encrypted file with cryptographically signed components. At boot time of the operating system, the instructions cause the processor to boot a kernel of the operating system with a minimal number of modules loaded (e.g., fewer modules than needed for a fully functioning operating system) and to read and validate a signature of the file system. In response to validation of the file system, the instructions cause the processor to install packages of the file system into a transient, non-persistent storage circuit and encrypt the file system packages in response to installation. In response to installation of the file system packages, the instructions cause the processor to update the transient, non-persistent storage circuit to include additional modules to run as a fully functional operating system.

The above discussion is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
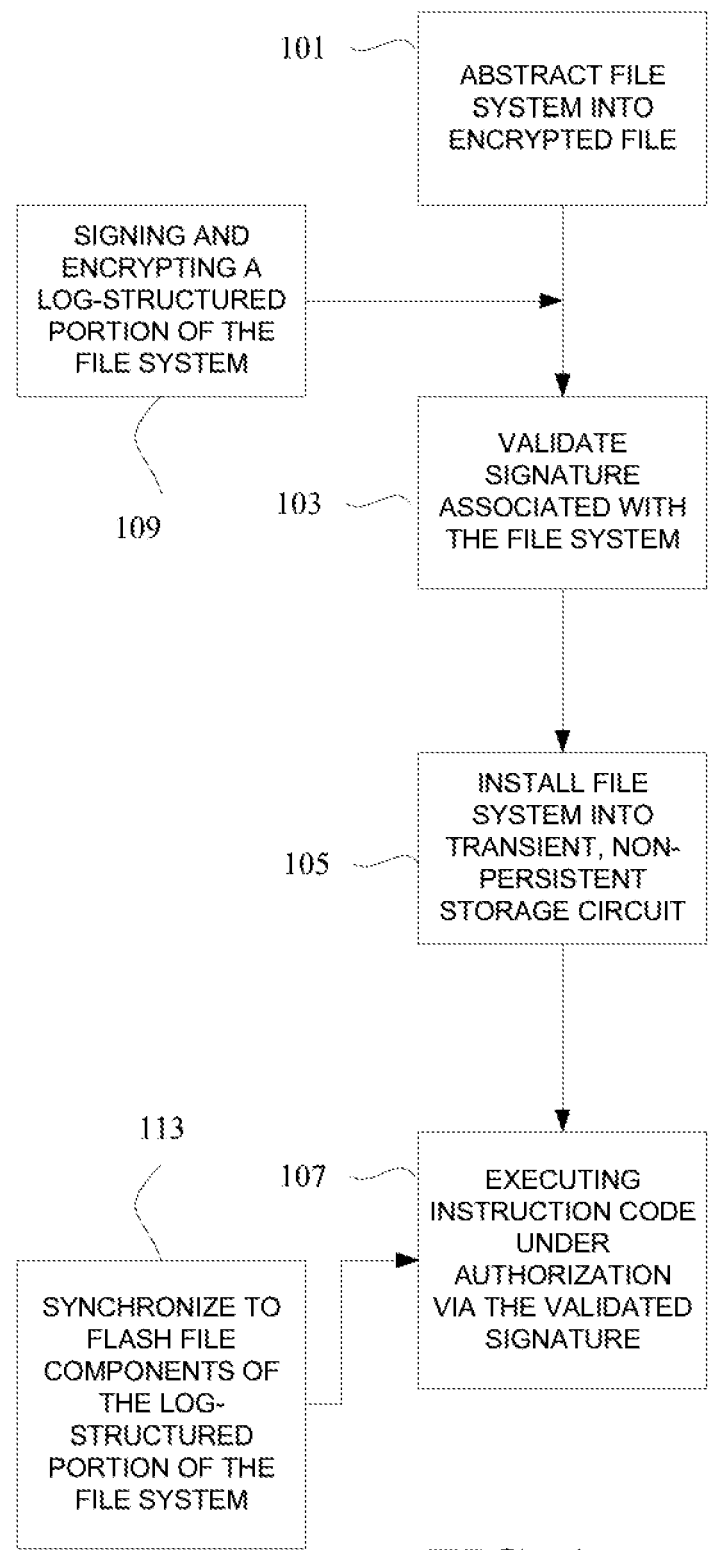
FIG. 1 is a flow chart illustrating an exemplary method for validation and installation of a file system, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

One method for gaining unauthorized access to media content transmitted from a remote location is to replace the firmware or software in devices used for accessing the media content remotely, such as that in a cable modem. This may be done by finding development or diagnostic backdoors or by replacing or reprogramming non-volatile memory chips that store the firmware or software image. While secure methods of downloading firmware for updates or other purposes, such as those from multi-system operators (MSOs), are available for remote provisioning, the integrity of the firmware or software usually is not checked after the installation. It is thus possible for a hacker to replace the firmware installed on the system with unauthorized code, thereby enabling the hacker to control the behavior of the compromised system.

Various types of media delivery systems or power management systems may face this threat of a hacker replacing firmware installed on a system with unauthorized code. For example, a hacker may also be able to replace the firmware or software in devices used for accessing media content from internet protocol television (IPTV) systems, or still other types of media delivery systems or power management systems. For a deployed computing device, the file system of the computing device may be compromised and system files may be corrupted or otherwise modified, and extraneous software or firmware can be added by an unauthorized individual. Such corrupted, modified, or extraneous code may alter the operation of the computing device or otherwise result in improper operation of the computing device. It is therefore desirable to provide a solution whereby such fraudulent access can be prevented or reduced.

Aspects of the present disclosure are believed to be applicable to a variety of different types of apparatuses, systems and methods involving validation and installation of a file system. In certain implementations, aspects of the present disclosure have been shown to be beneficial when used in the context of mitigating the risk of compromise to deployed computing devices, from corrupted and/or modified, and extraneous software and/or firmware added to the file system of the computing device by an unauthorized individual. While not necessarily so limited, various aspects may be appreciated through the following discussion of non-limiting examples which use exemplary contexts.

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In some cases, users may want special hardware or full access to specific hardware resources. Such access comes with risks for providers of those resources, however, as in a cloud or other shared environment there typically will be other users sharing those resources at various times, and a modification of the resource by one user can potentially be detrimental to subsequent users. It can be useful to ensure that one user does not alter the hardware configuration, firmware, or software in an inappropriate way that will affect other users, such as by altering firmware to inject malicious code.

For deployed products, there is a security concern, whereby the platform can be compromised and system files may be corrupted and/or modified, and extraneous software and/or firmware can be added to the system by a rogue actor. Some solutions to mitigate such risks, includes scanning installed files on the static drive and validating that they had not been altered after installation. If a discrepancy is detected, the firmware is reinstalled. Other solutions include scanning each file and generating a hash or checksum, and cross-referencing the hash or checksum against a secured file of hashes or checksums. Each of these methods are very time consuming and can dramatically increase boot times. Additionally, with such solutions, the table of hashes must be securely managed, which provides a set of complications to implement and minimizes file flexibility. In addition, such solutions do not identify rogue add-on files that are placed into the operating system, which would normally persist across reboots.

In accordance with various embodiments of the present disclosure, the file system on a deployed device may be protected against unauthorized file system alterations. As described herein, to mitigate such risks, the file system may first be abstracted into encrypted and cryptographically signed components. Secondly, in accordance with such example embodiments, a non-persistent RAM based file system is created. During boot time, the system operating system, software, and the firmware are unencrypted and the signature is validated. After validation, the operating system, software, and the firmware are installed into the RAM file system. This ensures that the firmware running on the single board is authorized and mitigates the risk of file system tampering. The RAM based file system may ensure that files that were inadvertently or surreptitiously added will be purged during the next boot cycle.

Examples of the present disclosure can be used on applications where it would be advantageous to validate and reinstall the original code on each reboot, such as may be the case with systems which are deployed remotely. Additionally, examples of the present disclosure provide an added layer of security potential, along with the performance gain at boot time. Files that are altered, or added, will be refreshed (e.g., cleaned) and extraneous files will be purged during the next system reset or boot cycle.

Embodiments of the present disclosure minimize the use of resources to scan through each file on boot up and allow system level instructions to remain encrypted at all times on the file system, which protects the system from physical attack vectors (such as extracting the flash from the board and reading on an external flash reader). Additionally, embodiments of the present disclosure provide performance gains at boot time and automatically purge rogue files during system reboots.

Accordingly, in the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In accordance with various example embodiments, methods for mitigating security breaches for a circuit platform, such as a computing device, subject to compromise by unauthorized changes to a file system include abstracting the file system into an encrypted file with cryptographically signed components. As described herein, the file system may have instruction code or other data for an operating system, the file system being stored by or on behalf of the circuit platform for use by the circuit platform. During boot time of the operating system, an unencrypted version of the operating system may be accessed and used by validating a signature associated with the file system, relative to the signed components. In response to validating the signature, the file system may be installed into a transient, non-persistent storage circuit, such as a RAM-based storage circuit. Accordingly, the operating system may execute instruction code via a CPU circuit under authorization via the validated signature.

In some example embodiments, the transient, non-persistent storage circuit may perform an integrity check of the file system using one of an error-detecting algorithm and a cryptographic hash function. Exemplary and non-limiting integrity check processes include, for instance, CRC 32, SHA-1, and MD5SUM. CRC32 refers to or includes an error-detecting function that uses a CRC32 algorithm to detect changes between source and target data. The CRC32 function converts a variable-length string into an 8-character string that is a text representation of the hexadecimal value of a 32-bit binary sequence. Similarly, SHA-1 (Secure Hash Algorithm 1) refers to or includes a cryptographic hash function which takes an input and produces a 160-bit (20-byte) hash value known as a message digest, rendered as a hexadecimal number of 40 digits long. Yet further, MD5 SUM refers to or includes a computer program that calculates and verifies 128-bit MD5 hashes. The MD5 hash functions as a compact digital fingerprint of a file, where changes to a file will cause its MD5 hash to change.

The transient, non-persistent (e.g., RAM based) storage circuit may abstract the file system into the encrypted file with cryptographically signed components by signing and encrypting a portion of the file system, such as a log-structured portion of the file system, where that portion is configured and arranged for use with flash memory components of the circuit platform. Examples of such log-structure may include a Journaling Flash File System version 2 (JFFS2) file system blob. As used herein, JFFS2 refers to or includes a log-structured file system for use with flash memory devices. Due to the file system being implemented in a transient, non-persistent storage circuit (i.e., due to being RAM-based), an embodiment of the file system ensures that files or other data, such as code, compromised by unauthorized changes is purged during a subsequent boot cycle of the operating system.

In various example embodiments, the transient, non-persistent storage circuit is configured and arranged to boot at run time, a kernel including a binary application to read and validate the signatures of the firmware packages. In such embodiments, the binary application reads and validates the signatures of the firmware packages by executing a digital signature algorithm, such as an elliptic curve digital signature algorithm (ECDSA). In response to validating the signature, the CPU updates the transient, non-persistent storage circuit with additional modules to run as a fully functional operating system.

Once the file system packages are installed and the operating system boots, the transient, non-persistent storage circuit may monitor changes to profile and configuration files in the file system using the log-structured portion of the file system (e.g., the JFFS2 blob). As such, the transient, non-persistent storage circuit is configured and arranged to synchronize to flash file components of a log-structured portion of the file system.

Additional example embodiments are directed toward a system for validating a file system, the system including a processor with a CPU circuit, and the system further including a memory circuit having instructions that, when executed by the processor, cause the processor to perform a number of functions. For instance, the memory circuit may include instructions that cause the processor, during boot time of a file system having instruction code or other data, to boot a transient, non-persistent (e.g., RAM based) storage circuit with a minimal number of modules loaded. In some embodiments, the file system is validated and launched using a primary boot loader, and the transient, non-persistent storage circuit is accessed responsive to validation and launch of the file system using the primary boot loader. The memory circuit may include instructions that cause the processor to read and validate a signature of the file system and, in response to validation of the file system, install packages of the file system into the transient, non-persistent storage circuit. In response to installation of the file system packages, the processor updates the transient, non-persistent storage circuit to include additional modules to run as a fully functional operating system. Additionally, the memory circuit may include instructions that cause the processor to encrypt the packages of the file system and, in response to installation of the file system packages, decrypt and load configuration and running-state files of the file system.

In some example embodiments, the memory circuit includes instructions that, when executed by the processor, cause the processor to monitor the load configuration and running-state files of the file system during run time. In response to identification of a change in the load configuration or running-state files, the memory circuit may instruct the processor to update the changed files on the encrypted file system.

Turning to the Figures, FIG. 1 is a flow chart illustrating an exemplary method for validation and installation of a file system, in accordance with the present disclosure. As illustrated in FIG. 1, the method begins at 101 with abstracting the file system into an encrypted file with cryptographically signed components. As described herein, the transient, non-persistent (e.g., RAM based) storage circuit may abstract the file system into the encrypted file with cryptographically signed components by signing and encrypting a log-structured portion of the file system at 109, configured and arranged for use with flash memory components of the circuit platform (such as a JFFS2 file system blob).

At 103, the method includes validating a signature associated with the file system and relative to the signed components. For instance, the transient, non-persistent storage circuit may boot at run time a kernel including a binary application to read and validate the signatures of the firmware packages. In such embodiments, the binary application reads and validates the signatures of the firmware packages (i.e., validates the signatures of the signed components) by executing a digital signature algorithm, such as an elliptic curve digital signature algorithm (ECDSA). At 105, the method includes installing the file system into the transient, non-persistent storage circuit, and at 107, instruction code is executed under authorization via the validated signature. In some example embodiments, the method includes causing the transient, non-persistent storage circuit to synchronize to flash file components of the log-structured portion of the file system at 113.

Figure 2A:
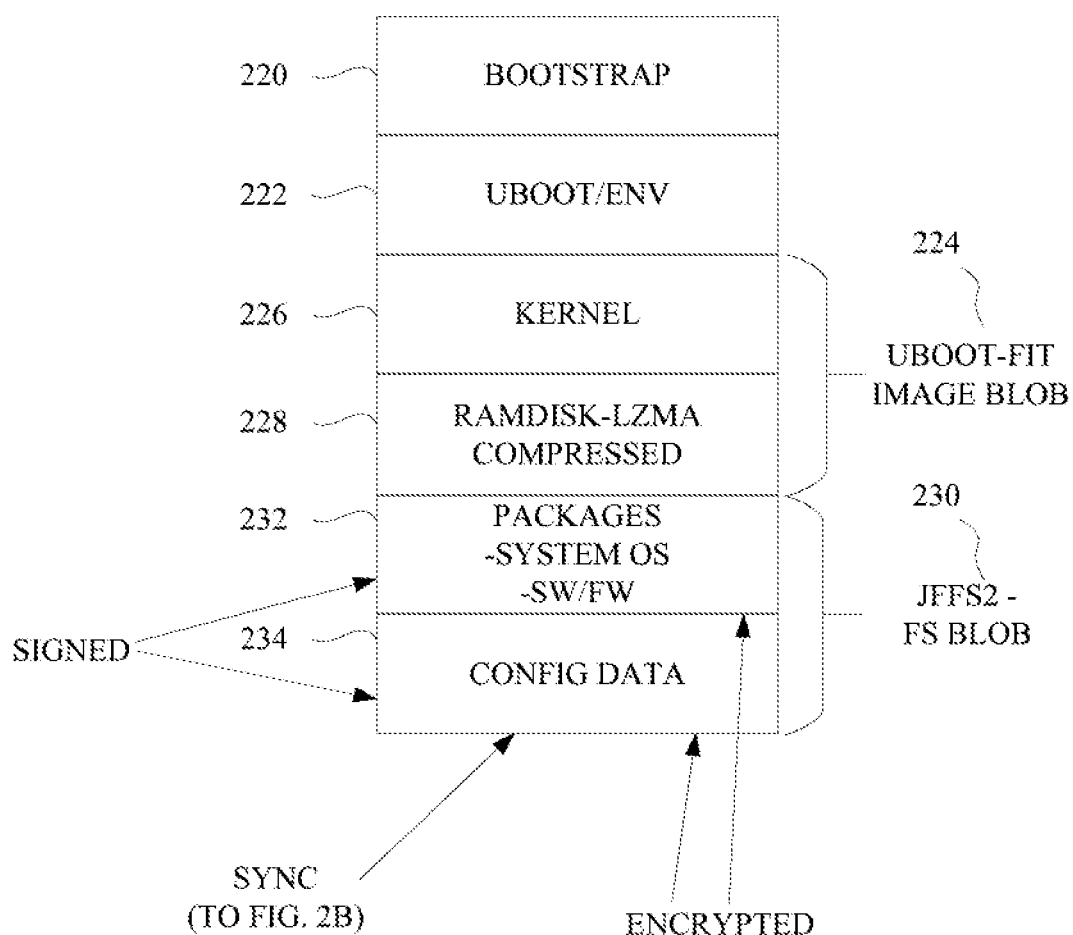
FIG. 2A is a portion of a flow chart illustrating an exemplary method for validation and installation of a file system, in accordance with the present disclosure.

FIG. 2A is a portion of a flow chart illustrating an exemplary method for validation and installation of a file system, in accordance with the present disclosure. At 220, the method includes execution of bootstrap instructions, such as by a bootstrap loader (also referred to as a boot loader). In computing, a bootstrap loader refers to or includes the first piece of code that runs when a machine starts, and is responsible for loading the rest of the operating system. The bootstrap instructions may be stored in read only memory (ROM). Das U-Boot (also referred to as "the Universal Boot Loader" or U-Boot) refers to an open source, primary boot loader used in embedded devices to package the instructions to boot the device's operating system kernel, and in some embodiments, U-Boot is used as the boot loader as described herein. However, it will be understood that alternative boot loaders may be used, and thus, references herein to the use of U-Boot are for illustrative purposes only. The kernel is booted with a minimal number of modules loaded. For instance, the modules loaded in the kernel may be only those required to read and process packages to install the remainder of the file system later. The modules in the minimal number of modules may include, for example, flash drivers and encryption facilities. At 222, U-boot environment instructions are executed. The U-boot environment refers to or includes a small amount of space used by U-boot on the flash storage to store some configuration parameters. The U-boot environment include values including the IP address of the TFTP server to which the TFTP client (part of U-Boot) will try to connect.

At 224, a set of instructions is executed. More specifically, for instance, a U-boot flattened image tree (FIT) image set of instructions (e.g., blob) is executed. The FIT image format works as a tree structure, like the device-tree, where an image source file (.its) and a set of data files are used as an input, and an image tree blob (.itb) is generated as an output. In some embodiments, the U-boot-FIT image blob includes execution of a kernel at 226 and execution of a RAMDisk Lempel-Ziv-Markov chain algorithm (LZMA) compressed file at 228. As used herein, LZMA refers to or includes is an algorithm used to perform lossless data compression. LZMA uses a dictionary compression scheme and features a high compression ratio and a variable compression-dictionary size (up to 4 GB), while still maintaining decompression speed similar to other compression algorithms. It will be understood that embodiments described herein are not limited to the use of RAMDisk; rather, additionally or alternatively, another technique to utilize system memory as a disk drive may be used. Analogously, it will be understood that embodiments described herein are not limited to the LZMA chain algorithm; rather, other compression algorithms may be used additionally or alternatively to the LZMA algorithm.

At 224, various integrity checking processes may be performed. For instance, CRC 32, SHA-1, and MD5SUM. CRC32 refers to or includes an error-detecting function that uses a CRC32 algorithm to detect changes between source and target data. The CRC32 function converts a variable-length string into an 8-character string that is a text representation of the hexadecimal value of a 32 bit-binary sequence. SHA-1 (Secure Hash Algorithm 1) refers to or includes a cryptographic hash function which takes an input and produces a 160-bit (20-byte) hash value known as a message digest—typically rendered as a hexadecimal number, 40 digits long. And MD5SM refers to or includes a computer program that calculates and verifies 128-bit MD5 hashes, as described in RFC 1321. The MD5 hash functions as a compact digital fingerprint of a file, and MD5SM is used to verify the integrity of files, as changes to a file will cause its MD5 hash to change.

At 230 a JFFS2 file system blob is executed. A JFFS2 file system blob refers to or includes a set of log-structured file system instructions for use with flash memory devices. At 230, one or more packages 232, which may include the operating system, software, and firmware, as well as the configuration data 234 of the file system are signed and encrypted, as described herein. For example, the packages 232 are signed using Landis+Gyr Packages (Signed) (LGPS) or some other signing technique. The signed and encrypted files are synchronized with a file monitor, as discussed with relation to FIG. 2B.

Figure 2B:
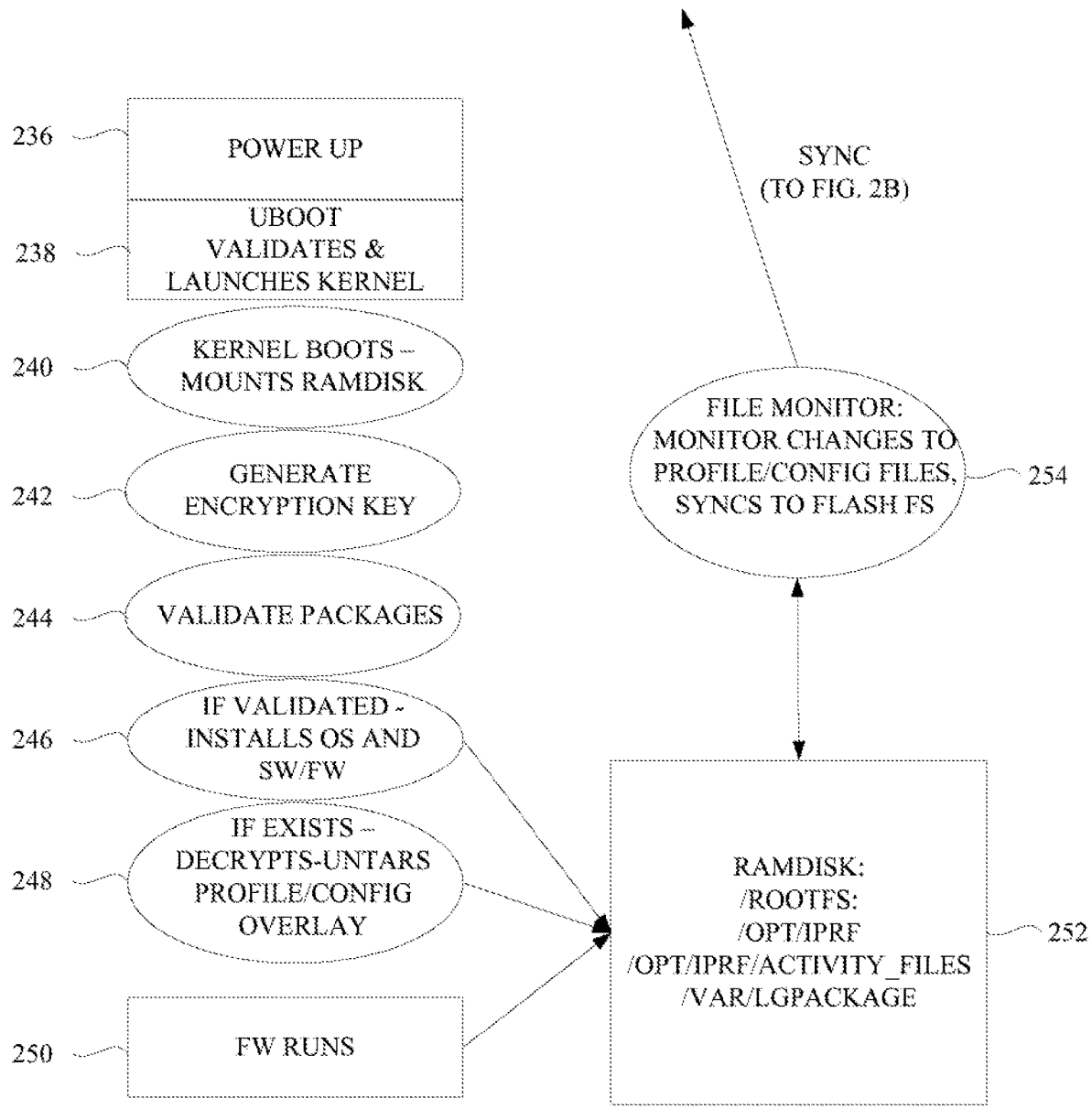
FIG. 2B is another portion of the flow chart illustrating an exemplary method for validation and installation of a file system, in accordance with the present disclosure.

FIG. 2B is another portion of the flow chart illustrating an exemplary method for validation and installation of a file system, in accordance with the present disclosure. As illustrated and discussed with regards to FIG. 2A, the signed and encrypted files are synchronized with a file monitor. As illustrated in FIG. 2B, the method continues at 236 with power up of the computing device. At 238, the bootstrap instructions (e.g., U-boot) validate and launch the kernel with a minimal number of modules loaded. At 240, the kernel accesses the transient, non-persistent storage circuit (e.g., RAMDisk). At 242, an encryption key is generated, and at 244 the packages 232 are read and validated. As described herein, a binary application that is part of this RAMDisk may utilize ECDSA to read and validate the signature of the file system packages. Once the signature has been validated the file system packages are installed at 246 into the RAMDisk 252, one at a time, thus insuring file system integrity.

In the process of installing the file system packages, the kernel is updated to include additional modules to enable the kernel to run as a fully functional operating system at 250. The additional modules may include, for example, networking and communication modules as well as other modules required to provide an operating system. When the installed file system starts, the file system will decrypt and load configuration and running-state files, if they are available at 248. While the application is running, a file monitor may monitor the configuration and running-state files at 254. When these files change, the files are updated on the encrypted file system to keep them up to date and persistent across a system reboot. This mechanism provides persistence, across reboot cycles, of modifiable files, thereby giving the feel of a standard file system, while providing file validation and integrity checking for files.

Figure 3:
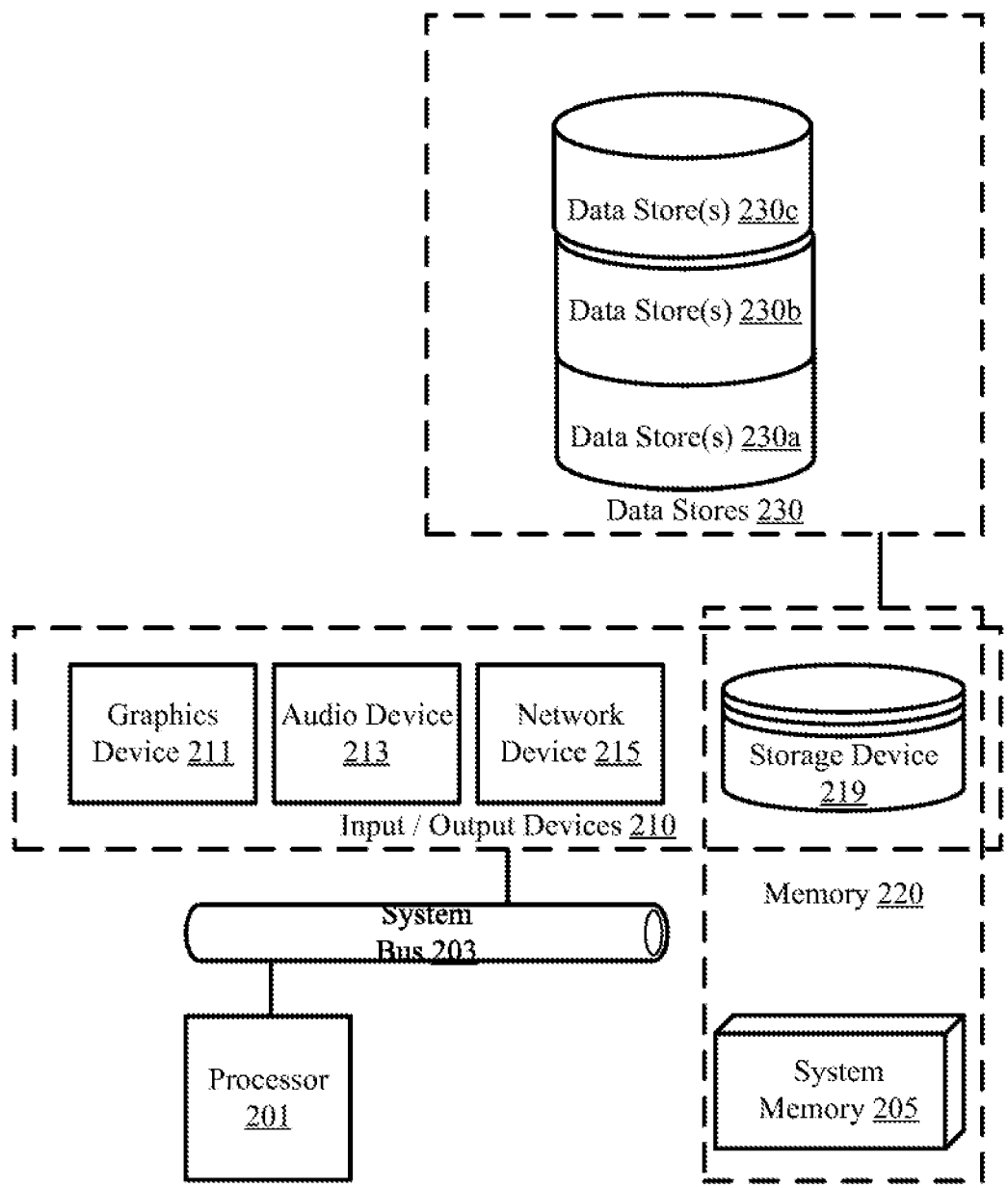
FIG. 3 is a block diagram illustrating an exemplary system for validation and installation of a file system, in accordance with the present disclosure.

FIG. 3 is a block diagram illustrating an exemplary system for validation and installation of a file system, in accordance with the present disclosure. The system facilitates the validation and installation of a file system via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the system may receive, obtain, aggregate, process, generate, store, retrieve, send, delete, input, output, and/or the like data (including program data and program instructions); may execute program instructions; and may communicate with computer systems, nodes, users, and/or the like. In various embodiments, the system may comprise a standalone computer system, a distributed computer system, a node in a computer network (i.e., a network of computer systems organized in a topology), and/or the like. It is to be understood that the system and/or the various system elements (e.g., processor, system bus, memory, input/output devices) may be organized in any number of ways (i.e., using any number and configuration of computer systems, computer networks, nodes, system elements, and/or the like) to validate and install a file system in accordance with the disclosure.

The system includes a processor 201 that executes program instructions (e.g., system program instructions). The processor may be implemented using integrated circuits (ICs), application-specific integrated circuits (ASICs), field-programmable gate arrays (FPGAs), and/or the like. The processor may be connected to system memory 205 via a system bus 203. The system bus may interconnect these and/or other elements of the system via electrical, electronic, optical, wireless, and/or the like communication links. In various embodiments, the system bus may comprise one or more control buses, address buses, data buses, memory buses, peripheral buses, and/or the like. The processor may access, read from, write to, store in, erase, modify, and/or the like, the system memory in accordance with program instructions executed by the processor. The system memory may facilitate accessing, storing, retrieving, modifying, deleting, and/or the like data by the processor.

In various embodiments, input/output devices 210 may be connected to the processor and/or to the system memory, and/or to one another via the system bus. In some embodiments, the input/output devices may include one or more graphics devices 211. The processor may make use of the one or more graphic devices in accordance with program instructions (e.g., system program instructions) executed by the processor. The graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 213. The processor may make use of the one or more audio devices in accordance with program instructions (e.g., system program instructions) executed by the processor. In one implementation, an audio device may be a sound card that may obtain (e.g., via a connected microphone), process, output (e.g., via connected speakers), and/or the like audio data (e.g., system data). The audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 215. The processor may make use of the one or more network devices in accordance with program instructions (e.g., system program instructions) executed by the processor. In one implementation, a network device may be a network card that may obtain, process, output, and/or the like network data (e.g., system data). The network device may be discreet, external, embedded, integrated into a motherboard, and/or the like. The network device may operate in combination with other network devices (e.g., in parallel) to provide improved data throughput, redundancy, and/or the like. In some embodiments, the input/output devices may include one or more storage devices 219. The processor may access, read from, write to, store in, erase, modify, and/or the like a storage device in accordance with program instructions (e.g., system program instructions) executed by the processor. A storage device may facilitate accessing, storing, retrieving, modifying, deleting, and/or the like data (e.g., system data) by the processor. In one implementation, the processor may access data from the storage device directly via the system bus. In another implementation, the processor may access data from the storage device by instructing the storage device to transfer the data to the system memory and accessing the data from the system memory.

The storage device 219 may be discreet, external, embedded, integrated (e.g., into a motherboard, into another storage device), and/or the like. A storage device 219 may operate in combination with other storage devices to provide improved capacity, data throughput, data redundancy, and/or the like. Together and/or separately the system memory 205 and the one or more storage devices 219 may be referred to as memory 220 (i.e., physical memory).

System memory 220 contains processor-operable (e.g., accessible) system data stores 230. Data stores 230 comprise data that may be used (e.g., by the system) via the system. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Data stores 230 may comprise a non-transitory machine readable medium storing instructions executable by processor 201 to perform a specified function related to the generation and display of an improved real-estate user interface, as discussed herein. Accordingly, each of the respective data stores 230a-230c include programmatic instructions which, when executed by processor 201, provide for to validation and installation of a file system in accordance with the present disclosure.

For instance the data stores 230 may include programmatic instructions which, when executed by processor 201, mitigate security breach for a circuit platform subject to compromise by unauthorized changes to a file system, the file system having instruction code or other data for an operating system and being stored by or on behalf of the circuit platform. The data stores 230 may include programmatic instructions which, when executed by processor 201, cause the processor 201 to abstract the file system into an encrypted file with cryptographically signed components, and at boot time of the operating system, boot a kernel of the operating system with a minimal number of modules loaded. The data stores 230 may further include programmatic instructions which, when executed by processor 201, read and validate a signature of the file system, and install packages of the file system into a transient, non-persistent storage circuit. In response to installation of the file system packages, the processor 201 may encrypt the file system packages, and in response to installation of the file system packages, the processor 201 may update the transient, non-persistent storage circuit to include additional modules to run as a fully functional operating system.

As discussed herein, the data stores 230 may include programmatic instructions which, when executed by processor 201, cause the processor to validate and launch the kernel using a primary boot loader, and access the transient, non-persistent storage circuit responsive to validation and launch of the kernel. In response to installation of the file system packages, the processor 201 may decrypt and load configuration and running-state files of the operating system. During run time, the processor 201 may monitor the load configuration and running-state files of the operating system, and in response to identification of a change in the load configuration or running-state files, the processor 201 may update the changed load configuration or running-state files on the encrypted file system.

Moreover, the data stores 230 may include programmatic instructions which, when executed by processor 201, cause the processor to generate an encryption key using the transient, non-persistent storage circuit, and validate the file system using the generated encryption key. In response to installation of the file system packages, the processor 201 may decrypt and load configuration and running-state files of the operating system, as discussed herein.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 201, 203, 205, 219, 220, and 239 of FIG. 2 depict a block or module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations, as may be carried out in the approaches shown in FIGS. 2A and 2B. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described with regards to FIGS. 1, 2A and 2B is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, more or fewer steps than illustrated in FIGS. 1, 2A, and 2B may be performed. As another example, the steps illustrated in FIGS. 1, 2A, and 2B may be performed in a different order than illustrated. Such modifications do not depart from the true spirit and scope of various aspects of the disclosure, including aspects set forth in the claims

What is claimed is:

1. A method for mitigating security breach for a circuit platform subject to compromise by unauthorized changes to a file system, the file system having data for an operating system and being stored for use by the circuit platform, the method comprising:

abstracting the file system into an encrypted file with cryptographically signed components;

during a boot time of the operating system, accessing and using an unencrypted version of the operating system and the encrypted file by validating a signature associated with the file system and related to the cryptographically signed components;

in response to validating the signature of the file system, installing the file system into a transient, non-persistent storage circuit, wherein the operating system executes instruction code via a central processing unit (CPU) to decrypt and load a running-state file of the file system;

detecting a file change to the running-state file of the file system, wherein the running-state file represents a state of the file system;

updating the encrypted file to produce an updated encrypted file incorporating the file change to the running-state file of the file system;

during a second boot time of the operating system, reinstalling and starting the file system in the transient, non-persistent storage circuit;

responsive to starting the file system in the transient, non-persistent storage circuit, decrypting the updated encrypted file, including the running-state file incorporating the file change; and loading the running-state file into the transient, non-persistent storage circuit to preserve the state of the file system across a reboot.

2. The method of claim 1, further comprising causing the transient, non-persistent storage circuit to perform an integrity check of the file system using at least one of an error-detecting algorithm or a cryptographic hash function.

3. The method of claim 1, wherein the transient, non-persistent storage circuit purges unauthorized changes during a subsequent boot cycle of the operating system.

4. The method of claim 1, comprising causing the transient, non-persistent storage circuit to abstract the file system into the encrypted file with the cryptographically signed components by signing and encrypting a log-structured portion of the file system, wherein the log-structured portion is configured and arranged for use with a flash memory component of the circuit platform.

5. The method of claim 1, comprising causing the transient, non-persistent storage circuit to boot, at run time, a kernel including a binary application to read and validate the cryptographically signed components of the file system.

6. The method of claim 5, wherein the binary application reads and validates the cryptographically signed components of the file system by executing a digital signature algorithm.

7. The method of claim 4, comprising causing the transient, non-persistent storage circuit to synchronize to flash file components of the log-structured portion of the file system.

8. The method of claim 1, comprising causing the operating system to update, in response to validating the signature, the transient, non-persistent storage circuit with additional modules to run as a fully functional operating system.

9. A system for validating a file system, the system comprising:
a processor including a central processing unit (CPU) circuit; and
a memory circuit including instructions that, when executed by the processor, cause the processor to:
during a boot time of a file system having data, boot a transient, non-persistent storage circuit with a set of initial modules loaded;
read and validate a signature of the file system;
in response to validation of the signature of the file system, install packages of the file system into the transient, non-persistent storage circuit;
encrypt the packages of the file system to produce an encrypted file;
in response to installation of the packages of the file system, decrypt and load configuration and running-state files of the file system;
detect a file change to the configuration and running-state file of the file system,
wherein the running-state file represents a state of the file system;
update the encrypted file to produce an updated encrypted file incorporating the file change to the configuration and running-state files of the file system;
during a second boot time of the file system, starting the file system in the transient, non-persistent storage circuit;
responsive to starting the file system in the transient, non-persistent storage circuit, decrypting the updated encrypted file, including the running-state file incorporating the file change; and
loading the running-state file into the transient, non-persistent storage circuit to preserve the state of the file system across a reboot.

10. The system of claim 9, further comprising instructions that, when executed by the processor, cause the processor to:
use an elliptic curve digital signature algorithm to read and validate the signature of the file system.

11. The system of claim 9, further comprising instructions that, when executed by the processor, cause the processor to:
in response to installation of the packages of the file system, update the transient, non-persistent storage circuit to include additional modules to combine with the initial modules loaded to run as a fully functional operating system.

12. The system of claim 9, further comprising instructions that, when executed by the processor, cause the processor to:
validate and launch the file system using a primary boot loader; and
access the transient, non-persistent storage circuit responsive to validation and launch of the file system using the primary boot loader.

13. A non-transitory computer readable medium storing instructions for mitigating security breach for a circuit platform subject to compromise by unauthorized changes to a file system, the file system having data for an operating system and being stored for use by the circuit platform, the instructions when executed by a processor including a central processing unit (CPU) circuit cause the processor to:
abstract the file system into an encrypted file with cryptographically signed components;
at a boot time of the operating system, boot a kernel of the operating system with a set of initial modules loaded;
read and validate a signature of the file system;
in response to validation of the file system, install packages of the file system into a transient, non-persistent storage circuit;
in response to installation of the packages of the file system, encrypt the packages of the file system to produce an encrypted file;
in response to installation of the packages of the file system, update the transient, non-persistent storage circuit to include additional modules to enable the operating system to run as a fully functional operating system;
in response to installation of the packages of the file system, decrypt and load configuration and running-state files of the file system;
detect a file change to the configuration and running-state file of the file system, wherein the running-state file represents a state of the file system;
update the encrypted file to produce an updated encrypted file incorporating the file change to the configuration and running-state files of the file system;
during a second boot time of the operating system, reinstalling and starting the file system in the transient, non-persistent storage circuit; and
responsive to starting the file system in the transient, non-persistent storage circuit, decrypting the updated encrypted file, including the running-state file incorporating the file change; and
loading the running-state file into the transient, non-persistent storage circuit to preserve the state of the file system across a reboot.

14. The non-transitory computer readable medium of claim 13, further comprising instructions to:
validate and launch the kernel using a primary boot loader; and
access the transient, non-persistent storage circuit responsive to validation and launch of the kernel.

15. The non-transitory computer-readable medium of claim 13, further comprising instructions to:
generate an encryption key using the transient, non-persistent storage circuit; and
validate the file system using the generated encryption key.

16. The non-transitory computer readable medium of claim 13, further comprising instructions to:
in response to installation of the packages of the file system, decrypt and load configuration and running-state files of the operating system.

* * * * *